(12) United States Patent
Daniels et al.

(10) Patent No.: US 8,881,026 B2
(45) Date of Patent: Nov. 4, 2014

(54) HUMAN-TO-HUMAN COLLABORATIVE SESSION REQUEST QUEUE PROCESSING

(75) Inventors: Fonda J. Daniels, Cary, NC (US);
Ruthie D. Lyle, Durham, NC (US);
Michael Muller, Medford, MA (US);
Andrew L. Schirmer, Andover, MA (US)

(73) Assignee: International Business Machines Corporation, Armonk, NY (US)

(\*) Notice: Subject to any disclaimer, the term of this patent is extended or adjusted under 35 U.S.C. 154(b) by 1361 days.

(21) Appl. No.: 11/179,950

(22) Filed: Jul. 12, 2005

(65) Prior Publication Data

US 2007/0014284 A1 Jan. 18, 2007

(51) Int. Cl.
*G06F 3/00* (2006.01)

(52) U.S. Cl.
USPC ........... 715/753; 715/758; 715/733; 715/744; 715/747; 715/751

(58) Field of Classification Search
USPC ................................................ 715/753, 758
See application file for complete search history.

(56) References Cited

U.S. PATENT DOCUMENTS

| | | | |
|---|---|---|---|
| 5,850,594 A | 12/1998 | Cannon et al. | |
| 6,204,847 B1* | 3/2001 | Wright | 715/804 |
| 6,269,369 B1 | 7/2001 | Robertson | |
| 6,449,646 B1* | 9/2002 | Sikora et al. | 709/226 |
| 6,654,790 B2 | 11/2003 | Ogle et al. | |
| 6,658,095 B1 | 12/2003 | Yoakum et al. | |
| 6,801,520 B2 | 10/2004 | Philonenko | |
| 7,222,305 B2* | 5/2007 | Teplov et al. | 715/751 |
| 2001/0004746 A1* | 6/2001 | Wright | 709/314 |
| 2002/0065894 A1 | 5/2002 | Dalal et al. | |
| 2002/0120697 A1 | 8/2002 | Generous et al. | |
| 2002/0131399 A1* | 9/2002 | Philonenko | 370/351 |
| 2003/0037113 A1 | 2/2003 | Petrovykh | |
| 2003/0065721 A1 | 4/2003 | Roskind | |

(Continued)

FOREIGN PATENT DOCUMENTS

| | | |
|---|---|---|
| CA | 2282931 A1 | 3/2001 |
| EP | 1463250 A2 | 9/2004 |
| GB | 2399256 A | 9/2004 |
| WO | WO 03/030003 A1 | 4/2003 |

OTHER PUBLICATIONS

Stadler, J., et al, *Scheduling in SIP Proxies*, Proceedings of the 2003 Int'l Conference on Information & Communication Technologies (ICT 2003), pp. 207-216 (abstract only).

(Continued)

*Primary Examiner* — Anil N Kumar
(74) *Attorney, Agent, or Firm* — Steven M. Greenberg, Esq.; CRGO Law

(57) ABSTRACT

Embodiments of the present invention address deficiencies of the art in respect to queued requests to establish human-to-human collaborative sessions and provide a novel and non-obvious method, system and computer program product for managing queued requests to establish human-to-human collaborative sessions. In one embodiment, a human-to-human collaborative data processing system can be provided which can include a messenger configured for coupling to other messengers. The system further can include a queue of incoming session requests to establish respective human-to-human collaborative sessions with requesters associated with the other messengers. Finally, the system can include queue management logic enabled to order the session requests in the queue according to queue rules coupled to the queue management logic.

10 Claims, 3 Drawing Sheets

(56) References Cited

U.S. PATENT DOCUMENTS

| | | | |
|---|---|---|---|
| 2003/0131064 | A1 | 7/2003 | Bell, III et al. |
| 2003/0135569 | A1 | 7/2003 | Khakoo et al. |
| 2003/0187672 | A1 | 10/2003 | Gibson et al. |
| 2003/0231647 | A1 | 12/2003 | Petrovykh |
| 2004/0083291 | A1 | 4/2004 | Pessi et al. |
| 2004/0117443 | A1* | 6/2004 | Barsness ............... 709/204 |
| 2004/0181577 | A1* | 9/2004 | Skurikhin et al. ........ 709/204 |
| 2006/0161853 | A1* | 7/2006 | Chen et al. ............... 715/758 |
| 2006/0242246 | A1 | 10/2006 | Lyle et al. |

OTHER PUBLICATIONS

Stadler, J., et al, *An Advanced Model for Scheduling in SIP Proxies*, Proceedings of the Third IASTED Int'l Conference on Wireless & Optical Communications, pp. 51-56 (abstract only).

Hildebrand, Joe, *Nine IM Accounts and Counting*, Queue, vol. 1, Issue 8, Nov. 2003, pp. 44-50.

Adamczyk, Piotr, et al, *If not now, when?: the effects of interruption at different moments within task execution*, Conference on Human Factors in Computing Systems, Vienna, Austria, 2004, pp. 271-278.

Miller, Sheryl L., *How do people manage interruptions in complex decision making tasks?*, Conference on Human Factors in Computing Systems, Seattle, WA, 2001, pp. 79-80.

Tang, John C., et al, *Beyond Instant Messaging*, Queue, vol. 1, Issue 8, Nov. 2003, pp. 28-37.

Nielsen, Jakob, *Curmudgeon: IM, Not IP (Information Pollution)*, Queue, vol. 1, Issue 8, Nov. 2003, pp. 76-75.

Chen, Daniel, et al, *Using mental load for managing interruptions in physiologically attentive user inferfaces*, Conference on Human Factors in Computing Systems, Vienna, Austria, 2004, pp. 1513-1516.

Cutrell, Edward B., et al; *Effects of Instant Messaging Interruptions on Computing Tasks*, CHI, Apr. 1-6, 2000, Interactive Posters, Microsoft Research.

* cited by examiner

HUMAN-TO-HUMAN COLLABORATIVE SESSION REQUEST QUEUE PROCESSING

BACKGROUND OF THE INVENTION

1. Field of the Invention

The present invention relates to the field of collaborative computing and more particularly to the field of human-to-human collaborative session requests queueing and dequeuing.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments such as instant messaging and persistent chat rooms.

Generally a human-to-human collaborative session can be initiated by soliciting the participation of one or more designated participants. When a designated participant accepts a request to engage in the session, the session will be established. On many occasions, however, the designated participant will not be able to accept the requested session, either because the participant is not available or because the participant chooses expressly to not participate in the requested session at the time of the request. In that circumstance, the requested session can be queued for processing when the designated recipient becomes available.

When a designated participant becomes available to participate in a human-to-human collaborative session, the participant can review the queue of pending sessions. Within the queue, some pending sessions will be considered by the participant to be of a higher priority than other sessions. Higher priority sessions will be established first while lower priority sessions will be established later. In any event, in many cases, the queue can be shallow enough that the designated participant can determine which pending sessions are more important than others. Where the queue grows to include a multiplicity of pending sessions, however, it can be much more difficult for the designated participant to prioritize the establishment of human-to-human collaborative sessions for the pending requests.

BRIEF SUMMARY OF THE INVENTION

Embodiments of the present invention address deficiencies of the art in respect to queued requests to establish human-to-human collaborative sessions and provide a novel and non-obvious method, system and computer program product for managing queued requests to establish human-to-human collaborative sessions. In one embodiment, a human-to-human collaborative data processing system can be provided which can include a messenger configured for coupling to other messengers. The system further can include a queue of incoming session requests to establish respective human-to-human collaborative sessions with requesters associated with the other messengers. Finally, the system can include queue management logic enabled to order the session requests in the queue according to queue rules coupled to the queue management logic.

In another embodiment, a session request queue management method can be provided. The method can include receiving session requests to establish human-to-human collaborative sessions with respective requestors, queuing the session requests in a queue in a human-to-human collaborative system, prioritizing the session requests in the queue according to queue rules for prioritizing session requests, and presenting the prioritized session requests in a user interface. The prioritizing step can include ordering each of the session requests in a position according to queue rules selected from the group consisting of time based rules, buddy list based rules, relative hierarchy based rules, dynamic interest profile based rules and category/role based rules. Alternatively, the prioritizing can include grouping the session requests into priority groups according to those queue rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for session request queue management in a human-to-human collaborative system. In accordance with an embodiment of the present invention, a queue can be maintained for incoming session requests for establishing human-to-human collaborative sessions, such as chat and instant messaging sessions as between a requestor and an invitee. The requests, when accepted can result in the establishment of a human-to-human collaborative session with the requester. However, prior to acceptance (or denial or deferral), the requests can be stored in a queue—particularly where the invitee is not available to establish a human-to-human collaborative session. In this way, when available, the invitee can view the pending requests for a human-to-human collaborative session and the invitee can selectively accept, deny or defer each on an individual or group basis.

To facilitate the processing of the pending requests in the queue, the queued requests can be ordered and optionally grouped within the queue. Specifically, a queue management process can apply one or more ordering and grouping rules to the individual requests in the queue to establish a preferred ordering. The queue ordering can be directly applied within a user interface presenting to the invitee the queue of pending requests for human-to-human collaborative sessions. Consequently, those requests which are considered to be of the highest priority can be viewed more readily by the invitee due to the ordering.

When the invitee chooses to view and act upon the different session requests within the queue, a dequeue management process can provide a grouping capability for selecting multiple session requests similarly in choosing whether to accept, defer or deny the session requests. Other options include docketing a reminder to handle processing of a designated session request at a later time. Finally, two or more of the session requests in the queue not only can be selected for acceptance in establishing a human-to-human collaborative session with the requestors, but the selected session requests can be grouped together into a single human-to-human collaborative session involving all of the requestors for the selected session requests in a single, multi-party human-to-human collaborative session.

Figure 1:
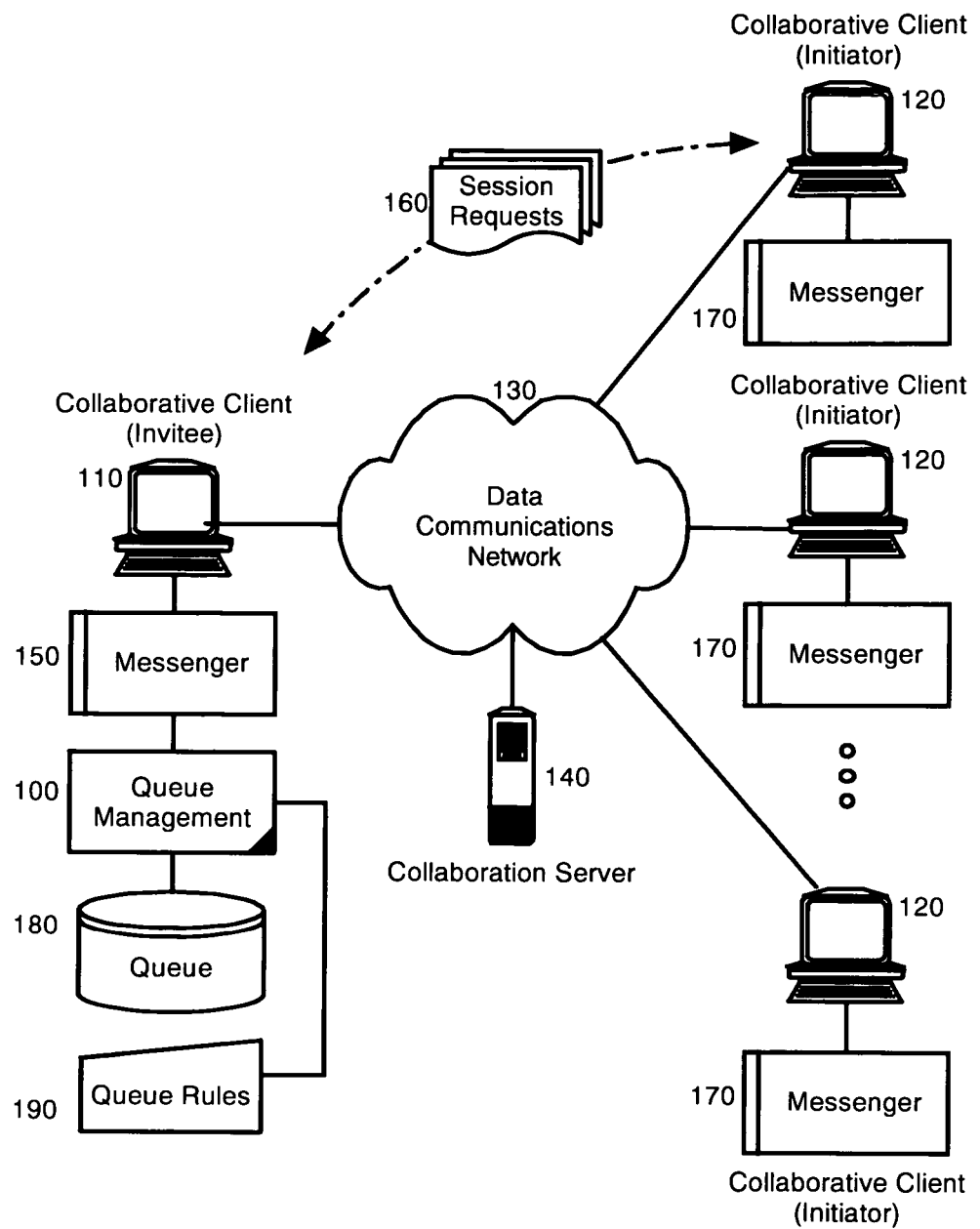
FIG. 1 is a schematic illustration of a human-to-human collaborative session management system configured for session request queue management.

In more particular illustration, FIG. 1 is a schematic illustration of a human-to-human collaborative session management system configured for session request queue management. The system can include a multiplicity of collaborative clients 110, 120 communicatively coupled to one another of a data communications network 130. Each of the collaborative clients 110, 120 can be configured both to request and receive session requests 160 to establish human-to-human collaborative sessions, though for ease of illustration, a single invitee client 110 is shown as compared to multiple human-to-human collaborative session initiators 120.

Each of the initiators 120 can include a messenger 170. Likewise, the invitee 110 can include a messenger 150. The messengers 150, 170 can be programmed to enable the establishment and maintenance of a human-to-human collaborative session with one another. In one embodiment, a collaboration server 140 can be provided to facilitate the establishment and maintenance of human-to-human collaborative sessions between the messengers 150, 170. In this regard, each of the messengers 150, 170 can be configured both to initiate and to accept session requests 160 to establish a human-to-human collaborative session.

Notably, queue management logic 100 can be provided for use by the messenger 150. The queue management logic 100 can be enabled to manage the content in a queue 180 of session requests 160. Specifically, the queue management logic 100 can be enabled to order the session requests 160 in the queue 180 according to one or more queue rules 190. The queue management logic 100 further can be enabled to provide a display of the queued session requests 160 in accordance with the rules-based ordering defined by the queue rules 190. Finally, the queue management logic 100 yet further can be enabled to moderate the dequeuing of the session requests 160 from the queue.

Figure 2:
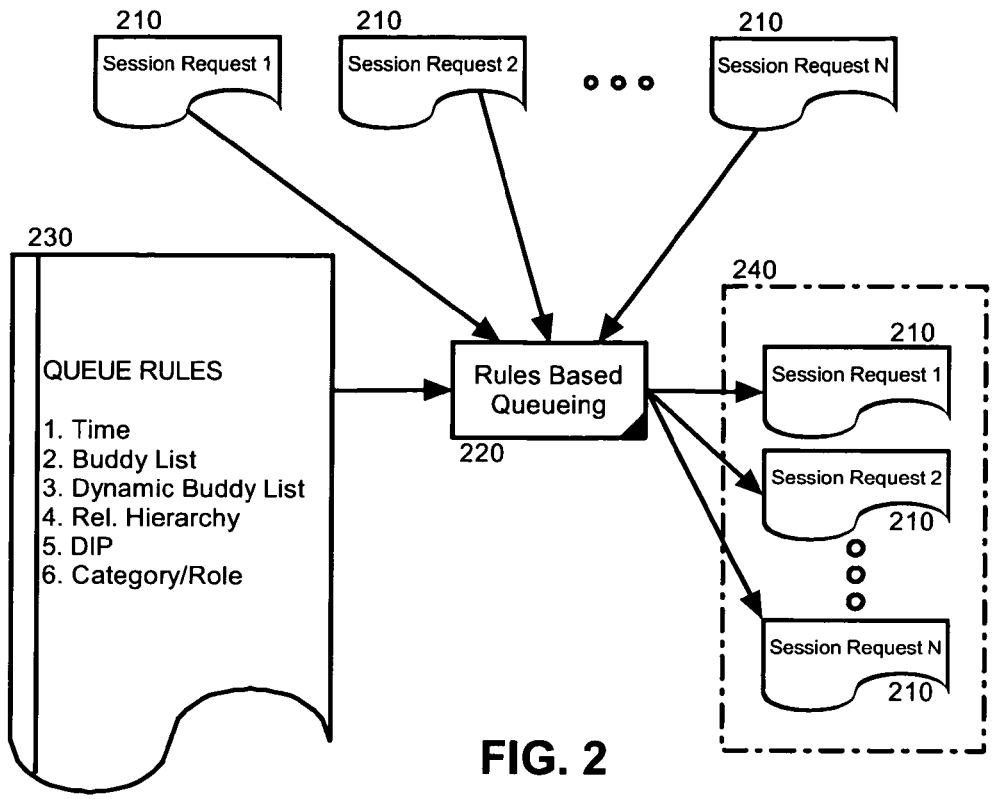
FIG. 2 is a block diagram illustrating a process for rules based session request queueing in the system of FIG. 1.

In further illustration, FIG. 2 is a block diagram illustrating a process for rules based session request queuing in the system of FIG. 1. As shown in FIG. 2, a multiplicity of session requests 210 can be received at different times, each of the session requests 210 requesting the establishment of a human-to-human collaborative session with the invitee. A rules based queuing process 220 can apply queue rules 230 to the incoming session requests 210 to determine a proper ordering and optionally, a proper grouping, of the session requests 210 in the queue 240.

The queue rules 230 can vary and six exemplary rules are shown. In a first rule, the session requests 210 are ordered according to the time when the session requests are received. In a second rule, the session requests 210 are ordered according to the presence of the requestors in a buddy list. Those session requests 210 originating from an requestor on a buddy list are deemed to be of a higher priority than those session requests 210 originating from a requestor not included in a buddy list. In a third rule, the session requests 210 can be ordered according to a dynamic buddy list of those contacts having short term relevance such as those whom have recently been party to a human-to-human collaborative session, those calendared for an appointment or task, or those with whom an e-mail message has been exchanged.

A fourth rule can include an ordering of the session requests 210 based upon a relationship hierarchy. A relationship hierarchy can include, but is not limited to, the relationship among requestors in an organizational chart, an organization directory or in a computing rights hierarchy. A fifth rule can include an ordering of the session requests 210 based upon a dynamic interest profile. A dynamic interest profile can include profile data which can be matched to the content of a session request 210 to establish a priority. The profile data can be collected from meta-data for documents associated with the invitee, for example. Finally, a sixth rule can include an ordering of the session requests 210 based upon a category or role assigned to the requesters and prioritized with respect to one another.

The session requests 210 can be ordered sequentially, or the session requests 210 can be grouped according to a priority such as "low", "medium" and "high". Alternatively, the session requests 210 can be ordered sequentially, and subsequently partitioned into different groups to establish a relative priority scheme. As yet another alternative, multiple ones of the queue rules 230 can be applied to the session requests 210 to form a composite rule. In the latter circumstance, the individual ones of the queue rules 230 can be weighted to form a weighted absolute position in the queue 240.

Figure 3:
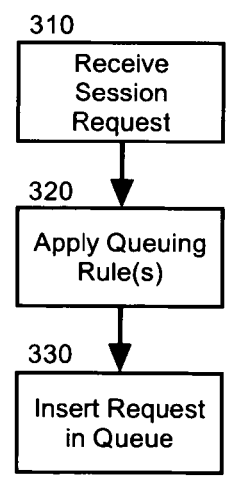
FIG. 3 is a flow chart illustrating a process for rules based session request queueing in the system of FIG. 1; and, FIG. 4 is a pictorial illustration of session request queue configured for session request dequeue management.

In further illustration, FIG. 3 is a flow chart illustrating a process for rules based session request queuing in the system of FIG. 1. Beginning in block 310, a session request can be received by an invitee. In block 320, the identity of the requester can be obtained and one or more of the queuing rules can be applied to the session request. In block 330, the application of the queuing rules can produce either a position in the queue of session requests, or a priority. Optionally, the application of the queuing rules can produce a position in the queue which subsequently can be considered in grouping all of the session requests in the queue into relative priorities.

Once session requests have populated the queue, the invitee can selectively address the session requests in the queue. Options include the acceptance of a session request so as to establish a human-to-human collaborative session with the requestor, the deferral of the session request to a later time, or the declination of the session request. In an embodiment of the present invention, groups of the session requests in the queue can be selected for action as a singular set. In this regard, a group of session requests can be selected for acceptance, deferral or declination.

Figure 4:
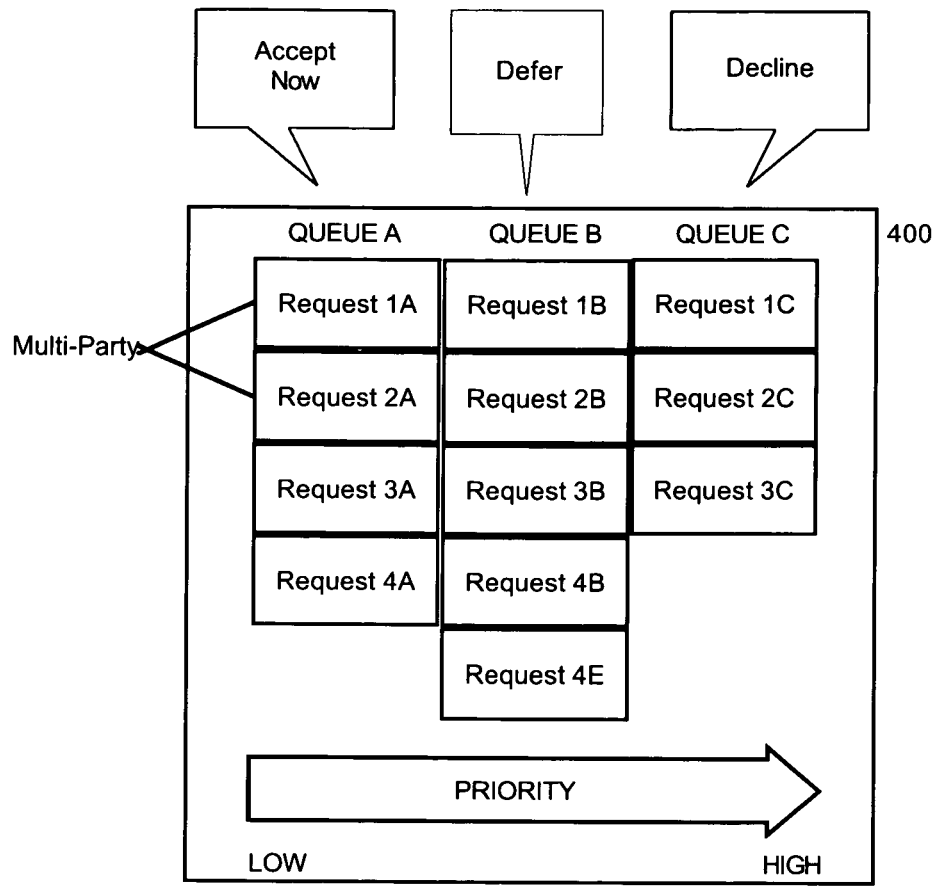

In more particular illustration, FIG. 4 is a pictorial illustration of session request queue configured for session request dequeue management. As shown in FIG. 4, the session requests in the queue 400 can be ordered according to a priority which can range from low to high. Groups of the session requests can be marked for acceptance such as the exemplary case of QUEUE A shown in FIG. 4, while groups of the session requests can be marked for deferral such as the exemplary case of QUEUE B. Finally, groups of the session requests can be marked for declination such as the exemplary case of QUEUE C in FIG. 4.

Optionally, referring to QUEUE A in FIG. 4, in respect to the acceptance of a session requests, two or more session requests can be selected for acceptance such that a single, multi-party human-to-human collaborative session can be established for the different requesters associated with different ones of the session requests in the selected grouping. In any case, as the session requests are acted upon, the session requests can be removed from the queue 400, e.g. dequeued. For those session requests which have been deferred, an alarm or reminder can be docketed for subsequent treatment by the invitee and the deferred session requests can remain in the queue 400 until that time.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a human-to-human collaborative system, a session request queue management method comprising:
    receiving, by a processor of a computer, a plurality of session requests from a user in a graphical user interface to establish human-to-human collaborative sessions with respective requesters;
    queuing said plurality of session requests in a queue in the human-to-human collaborative system executing on the processor;
    prioritizing said plurality of session requests in said queue according to queue rules for prioritizing said plurality of session requests by applying one or more queue rules to said plurality of session requests, weighting said applied queue rules and, computing a priority for each of said plurality of session requests based upon an outcome of said weighted, applied queue rules;
    presenting said prioritized plurality of session requests configured for selection in the graphical user interface before acting upon the selected one of said prioritized plurality of session requests to establish human-to-human collaborative sessions, the user enabled to select one of said prioritized plurality of session requests from the graphical user interface;
    selecting multiple ones of said prioritized plurality of session requests in said graphical user interface; and,
    assigning a dequeuinq action for said selected multiple ones of said prioritized plurality of session requests.

2. The method of claim 1, wherein said prioritizing further comprises ordering each of said plurality of session requests in a position according to queue rules selected from the group consisting of time based rules, buddy list based rules, relative hierarchy based rules, dynamic interest profile based rules and category/role based rules.

3. The method of claim 1, wherein said prioritizing further comprises grouping said plurality of session requests into priority groups according to queue rules selected from the group consisting of time based rules, buddy list based rules, relative hierarchy based rules, dynamic interest profile based rules and category/role based rules.

4. The method of claim 1, wherein said assigning the dequeuing action for said selected multiple ones of said prioritized plurality of session requests comprises assigning the dequeuing action for said selected multiple ones of said prioritized plurality of session requests selected from the group consisting of accepting, deferring and declining said selected multiple ones of said prioritized plurality of session requests.

5. The method of claim 1, wherein said assigning the dequeuing action for said selected multiple ones of said prioritized plurality of session requests comprises establishing a multi-party human-to-human collaborative session for all requesters associated with said selected multiple ones of said prioritized plurality of session requests.

6. A computer program product comprising a non-transitory computer usable storage medium having computer usable program code for session request queue management, said computer program product including:

computer usable program code for receiving a plurality of session requests from a user in a graphical user interface to establish human-to-human collaborative sessions with respective requestors;

computer usable program code for queuing said plurality of session requests in a queue in a human-to-human collaborative system;

computer usable program code for prioritizing said plurality of session requests in said queue according to queue rules for prioritizing said plurality of session requests by applying one or more queue rules to said plurality of session requests, weighting said applied queue rules and, computing a priority for each of said plurality of session requests based upon an outcome of said weighted, applied queue rules;

computer usable program code for presenting said prioritized plurality of session requests configured for selection in the graphical user interface before acting upon the selected one of said prioritized plurality of session requests to establish human-to-human collaborative sessions, the user enabled to select one of said prioritized plurality of session requests from the graphical user interface;

computer usable program code for selecting multiple ones of said prioritized plurality of session requests in said graphical user interface; and, computer usable program code for assigning a dequeuing action for said selected multiple ones of said prioritized plurality of session requests.

7. The computer program product of claim 6, wherein said computer usable program code for prioritizing further comprises computer usable program code for ordering each of said plurality of session requests in a position according to queue rules selected from the group consisting of time based rules, buddy list based rules, relative hierarchy based rules, dynamic interest profile based rules and category/role based rules.

8. The computer program product of claim 6, wherein said computer usable program code for prioritizing further comprises computer usable program code for grouping said plurality of session requests into priority groups according to queue rules selected from the group consisting of time based rules, buddy list based rules, relative hierarchy based rules, dynamic interest profile based rules and category/role based rules.

9. The computer program product of claim 6, wherein said computer usable program code for assigning the dequeuing action for multiple ones of said prioritized plurality of said selected session requests comprises computer usable program code for assigning the dequeuing action for said selected multiple ones of said prioritized plurality of session requests selected from the group consisting of accepting, deferring and declining said selected session requests.

10. The computer program product of claim 6, wherein said computer usable program code for assigning the dequeuing action for said selected multiple ones of said prioritized plurality of session requests comprises computer usable program code for establishing a multi-party human-to-human collaborative session for all requestors associated with said selected multiple ones of said prioritized plurality of session requests.

* * * * *